(12) United States Patent
Lee et al.

(10) Patent No.: US 8,548,484 B2
(45) Date of Patent: *Oct. 1, 2013

(54) METHOD OF RESOURCE RESERVATION REQUEST AND RESOURCE RESERVATION IN WIRELESS COMMUNICATION SYSTEM

(75) Inventors: Jin Lee, Seoul (KR); Ki Seon Ryu, Sungnam-si (KR); In Uk Jung, Seoul (KR); Gi Won Park, Anyang-si (KR); Yong Ho Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 210 days.

This patent is subject to a terminal disclaimer.

(21) Appl. No.: 13/122,389

(22) PCT Filed: Oct. 30, 2009

(86) PCT No.: PCT/KR2009/006334
§ 371 (c)(1),
(2), (4) Date: Apr. 1, 2011

(87) PCT Pub. No.: WO2010/053274
PCT Pub. Date: May 14, 2010

(65) Prior Publication Data
US 2011/0212731 A1    Sep. 1, 2011

Related U.S. Application Data

(60) Provisional application No. 61/111,730, filed on Nov. 6, 2008, provisional application No. 61/120,482, filed on Dec. 7, 2008.

(30) Foreign Application Priority Data

Mar. 20, 2009 (KR) .................. 10-2009-0023902
Jul. 3, 2009 (KR) .................. 10-2009-0060585

(51) Int. Cl.
*H04W 72/00* (2009.01)

(52) U.S. Cl.
USPC ..... 455/450; 455/451; 455/452.1; 455/452.2; 455/453; 455/63.1; 455/63.2; 455/67.11; 455/67.13; 370/328; 370/329; 370/330; 370/331; 370/332

(58) Field of Classification Search
USPC .................. 455/443, 444, 447, 449, 450, 451, 455/452.1, 452.2, 453, 63.1, 63.2, 67.11, 455/67.13; 370/328, 329, 330, 331, 332, 370/229, 230
See application file for complete search history.

(56) References Cited

U.S. PATENT DOCUMENTS 5,864,549 A * 1/1999 Honkasalo et al. ........... 370/335
6,721,568 B1 * 4/2004 Gustavsson et al. .......... 455/450

(Continued)

FOREIGN PATENT DOCUMENTS

KR     1020080045096     5/2008

*Primary Examiner* — Olumide T Ajibade Akonai
(74) *Attorney, Agent, or Firm* — Lee, Hong, Degerman, Kang & Waimey

(57) ABSTRACT

A method of resource reservation request and resource reservation in a wireless communication system is disclosed. A method of resource reservation request of a mobile station in a wireless communication system with femto cells comprises transmitting a resource reservation request message to a macro base station to request a femto cell base station not to use resource used by the mobile station if interference from the femto cell base station is over a threshold; and receiving a resource reservation response message from a macro base station.

25 Claims, 13 Drawing Sheets

(56) References Cited

U.S. PATENT DOCUMENTS

| | | | |
|---|---|---|---|
| 8,121,100 B2* | 2/2012 | Robson et al. | 370/338 |
| 8,144,725 B2* | 3/2012 | Bienas et al. | 370/449 |
| 8,223,683 B2* | 7/2012 | Czaja et al. | 370/315 |
| 8,280,387 B2* | 10/2012 | Guvenc et al. | 455/449 |
| 8,351,920 B2* | 1/2013 | Gallagher | 455/422.1 |
| 2006/0165032 A1* | 7/2006 | Hamalainen et al. | 370/328 |
| 2007/0097938 A1 | 5/2007 | Nylander et al. | |
| 2007/0270152 A1 | 11/2007 | Nylander et al. | |
| 2008/0076393 A1 | 3/2008 | Khetawat et al. | |
| 2009/0253421 A1* | 10/2009 | Camp et al. | 455/418 |
| 2010/0035556 A1* | 2/2010 | Cai et al. | 455/63.2 |

* cited by examiner

METHOD OF RESOURCE RESERVATION REQUEST AND RESOURCE RESERVATION IN WIRELESS COMMUNICATION SYSTEM

CROSS-REFERENCE TO RELATED APPLICATIONS

This application is the National Stage filing under 35 U.S.C. 371 of International Application No. PCT/KR2009/006334, filed on Oct. 30, 2009, which claims the benefit of earlier filing date and right of priority to Korean Application Nos. 10-2009-0060585, filed on Jul. 3, 2009 and 10-2009-0023902, filed on Mar. 20, 2009, and also claims the benefit of U.S. Provisional Application Serial Nos. 61/120,482, filed on Dec. 7, 2008 and 61/111,730, filed on Nov. 6, 2008, the contents of all of which are incorporated by reference herein in their entirety.

TECHNICAL FIELD

The present invention relates to a wireless communication system and more particularly to a method of resource reservation request and resource reservation in a wireless communication system.

BACKGROUND ART

Recently, technologies about femto cell for supporting indoor or shadow area which macro cell cannot support are being defined. A femto cell base station is a micromini and low power indoor base station. femto cell is a coverage of a femto cell base station and similar concept with pico cell. Femto cell is evolved more than pico cell. A femto cell base station is a mini cellular base station connected to a broadband router and connects data to backbone network of a mobile communication company trough Digital Subscriber Line (DSL).

A femto cell base station can be established as overlay in macro cell area or as non-overlay in area which a macro base station does not cover.

When a mobile station connected to a macro base station passes area of a femto cell base station established as overlay in macro cell area, it performs handover to the femto cell base station or not.

If a mobile station, which has authority to access to the femto cell base station and whose speed is low, performs handover to the femto cell base station, the mobile station can be served with good signal.

But, a mobile station, which does not have authority to access to the femto cell base station, cannot perform handover to the femto cell base station. If a mobile station whose speed is low performs handover to the femto cell base station, signal overhead generates because the mobile station is served by the femto cell base station in a short time and performs handover after escaping from area of the femto cell base station.

A femto cell base station established as overlay in macro cell area and the macro base station can use same frequency.

If a mobile station connected to a macro base station approach a femto cell base station established as overlay in macro cell area and does not performs handover to the femto cell base station, the mobile station receives interference from the femto cell base station.

In case that a femto cell base station does not use frequency band which is used by a macro base station, inter frequency handover between a femto cell base station and a macro base station occurs. And, a mobile station cannot receive downlink of a femto cell base station and a macro base station at once. And frequency band can not be used efficiently.

DISCLOSURE

Technical Problem

As previously stated above, the mobile station receives interference from a femto cell base station as overlay in macro cell area if femto cell base station established and the macro base station use same frequency. And, frequency band can not be used efficiently if a femto cell base station does not use frequency band which is used by a macro base station.

An object of the present invention is to provide an efficient method resource reservation.

Another object of the present invention is to provide a method resource reservation which reduces interference of a femto cell base station.

Another object of the present invention is to provide a method resource reservation which improves efficiency of frequency band.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

In order to solve the above technical problems, a method of resource reservation request of a mobile station in a wireless communication system with femto cells comprises transmitting a resource reservation request message to a macro base station to request a femto cell base station not to use resource used by the mobile station if interference from the femto cell base station is over a threshold; and receiving a resource reservation response message from a macro base station.

Also, the method further comprises transmitting a resource release request message to a macro base station if the interference from the femto cell base station is under the threshold.

Also, the resource reservation response message includes a code, and the method further comprises transmitting the code to a macro base station if the interference from the femto cell base station is under the threshold.

Also, the method further comprises transmitting a predetermined code to the macro base station to request bandwidth for transmitting the resource reservation request message.

Also, the resource reservation response message includes a report period at which the mobile station reports signal quality information to the macro base station, and the method further comprises transmitting the signal quality information to the macro base station every the report period.

Also, the resource reservation request message includes at least one among base station ID of the femto cell base station, RSSI of the macro base station, CINR of the macro base station and location information of the mobile station.

In order to solve the above technical problems, a method of resource reservation of a base station in a wireless communication system with femtocells comprises receiving a resource reservation request message from a mobile base station to request a femto cell base station not to use resource used by the mobile station; and requesting the femto cell base station to reserve the resource used by the mobile station.

Also, the method further comprises receiving a resource release request message from the mobile station; and requesting the femto cell base station release the reserved resource.

Also, the method further comprises Receiving a CQI (channel quality indication) report to inform that interference of the femto cell base station is over a threshold from the mobile station; and allocating the mobile station uplink bandwidth for transmitting the resource reservation request message.

In order to solve the above technical problems, a method of resource reservation of a macro base station in a wireless communication system with femto cells, comprises broadcasting a paging message on pre-determined position of a frame; and requesting a femto cell base station to reserve a resource of the pre-determined position.

In order to solve the above technical problems, a method of resource reservation request of a mobile station in a wireless communication system with femto cell, comprise transmitting first advanced air interface scan report (AAI_SCN-REP) message to a macro base station to request a femto cell base station not to use resource used by the mobile station if interference from the femto cell base station is over a threshold; being allocated bandwidth for CQI report transmission by period from the macro base station; and transmitting CQI report by period to the macro base station.

Also, the method further comprises transmitting CQI report including an interference indicator indicating that interference from the femto cell base station is reduced to the macro base station.

Also, the method further comprises receiving an unsolicited advanced air interface scan response (unsolicited AAI_SCN-RSP) message to order to scan neighbor base stations from the macro base station; and scanning the neighbor base stations and transmitting second AAI_SCN-REP message including result of the scanning to the macro base station.

In order to solve the above technical problems, a method of resource reservation of a macro base station in a wireless communication system with femto cell comprises receiving first advanced air interface scan report (AAI_SCN-REP) message to request a femto cell base station not to use resource used by the mobile station from a mobile station; allocating bandwidth for CQI report transmission by period to the mobile base station; and receiving CQI report by period from the mobile station.

Also, the method further comprises receiving CQI report including an interference indicator indicating that interference from the femto cell base station is reduced from the mobile station.

Also, the method further comprises transmitting an unsolicited advanced air interface scan response (unsolicited AAI_SCN-RSP) message to order to scan neighbor base stations to the mobile station; and receiving second AAI_SCN-REP message including result of the scanning the neighbor base stations from the mobile station.

In order to solve the above technical problems, a method of resource reservation request of a mobile station in a wireless communication system with femtocells comprises transmitting first advanced air interface scan report (AAI_SCN-REP) message to a macro base station to request a femto cell base station not to use resource used by the mobile station if interference from the femto cell base station is over a threshold; receiving an AAI_SCN-RSP message including a CINR threshold for second AAI_SCN-REP message transmission from the macro base station; scanning neighbor base stations if CINR is over the CINR threshold; and transmitting second AAI_SCN-REP message including result of the scanning the neighbor base stations to the macro base station.

In order to solve the above technical problems, a method of resource reservation of a macro base station in a wireless communication system with femtocells comprises receiving first advanced air interface scan report (AAI_SCN-REP) message to request a femto cell base station not to use resource used by the mobile station from a mobile station; transmitting an AAI_SCN-RSP message including a CINR threshold for second AAI_SCN-REP message transmission to the mobile station; and receiving second AAI_SCN-REP message including result of scanning neighbor base stations from the mobile station.

In order to solve the above technical problems, a method of resource reservation request of a mobile station in a wireless communication system with femtocells comprises transmitting a channel quality indicator (CQI) report to a macro base station when interference of femto cell base station is over a threshold; receiving an unsolicited AAI_SCN-RSP message from the macro base station; and scanning neighbor base stations and transmitting AAI_SCN-REP message including result of the scanning to the macro base station.

Advantageous Effects

According to the embodiments of the present invention, the following advantages can be obtained.

First of all, since a femto cell base station con not use frequency which a mobile station use if interference from the femto cell base station is over a threshold, interference is reduced.

Second, since resource is released if a mobile station escapes area of the femto cell base station, efficiency of frequency band is improved.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

Figure 1:
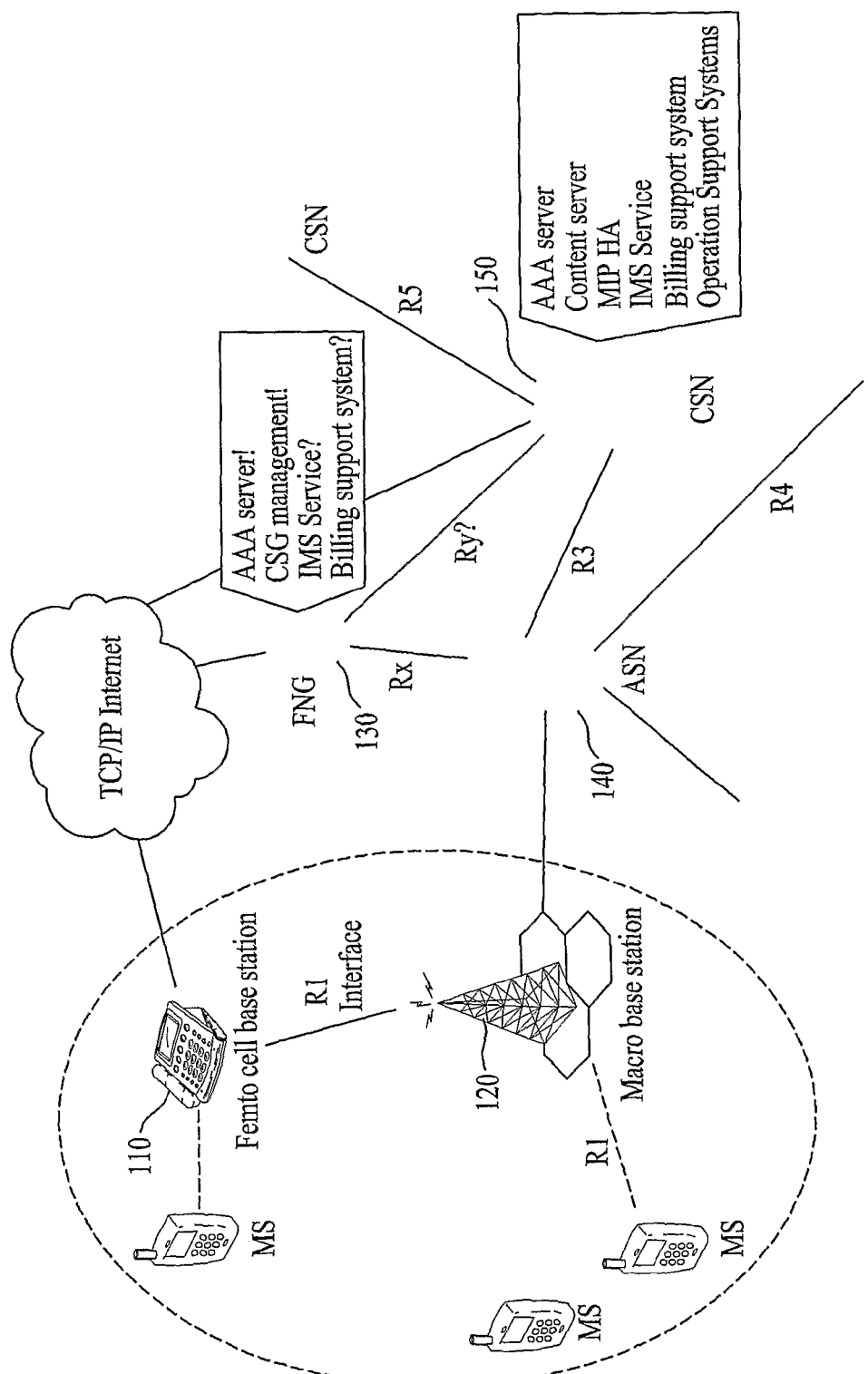
FIG. 1 is a schematic view illustrating a wireless communication system with femto cell base stations.

First, a wireless communication system with femto cell base stations will be described with reference to FIG. 1. FIG. 1 is a schematic view illustrating a wireless communication system with femto cell base stations.

Illustrated in FIG. 1, a wireless communication system with femto cell base stations comprises a femto cell base station 110, a macro base station 120, a femto network gateway (FNG) 130, an access service network (ASN) 140 and a connectivity service network (CSN) 150. A macro base station 120 is a general base station of a previous wireless communication system.

A femto cell base station 110 is a mini version of a macro base station and performs most functions of a macro base station. A femto cell base station 110 connects directly to a transmission control protocol/internet protocol (TCP/IP) network, operates independently like a macro base station 120. Coverage of a femto cell base station is about 0.1~30 m and a femto cell base station can accepts 10~20 mobile stations. Frequency used by a femto cell base station 210 can use same or different from that used by a macro base station 220.

A femto cell base station 110 connects to a macro base station 120 through R1 interface so to receive downlink channel from a macro base station 120 and transmit control signal to a macro base station 120.

A femto cell base station 110 can cover indoor or shadow area which a macro base station cannot cover and support high data rate transmission. A femto cell base station 110 can be established as overlay in macro cell area or as non-overlay in area which a macro base station does not cover.

There are two types of a femto cell base station 210. One type is a closed subscriber group (CSG) femto cell base station and another type is an open subscriber group (OSG) femto cell base station. A CSG femto cell base station groups mobile stations which is accessible to the CSG femto cell base station, grants the mobile stations CSG identification (ID) and allow the only mobile stations granted CSG ID to access to the CSG femto cell base station. An OSG femto cell base station is a base station which all mobile station can access.

A FNG 130 controls a femto cell base station 110 and connects to an ASN 140 and a CSN 150 through Rx and Ry interface respectively. A femto cell base station 110 can be served by a CSN 150 through a FNG 130. A mobile station connected to a femto cell base station 110 can be authenticated by a FNG 130 or a CSN 150.

A CSN 150 provides a mobile station authentication, charging function and an application service like internet and VoIP. And an ASN 140 controls a macro base station 120 and manages connection of a macro base station 120 and a CSN 150.

As described above, if femto cell base station does not use frequency band used by a macro base station, frequency band can not be used efficiently. Therefore, an embodiment of the present invention provides a method of resource reservation which reduces interference in case that a femto cell base station established as overlay in macro cell area and the macro base station use same frequency.

Figure 2:
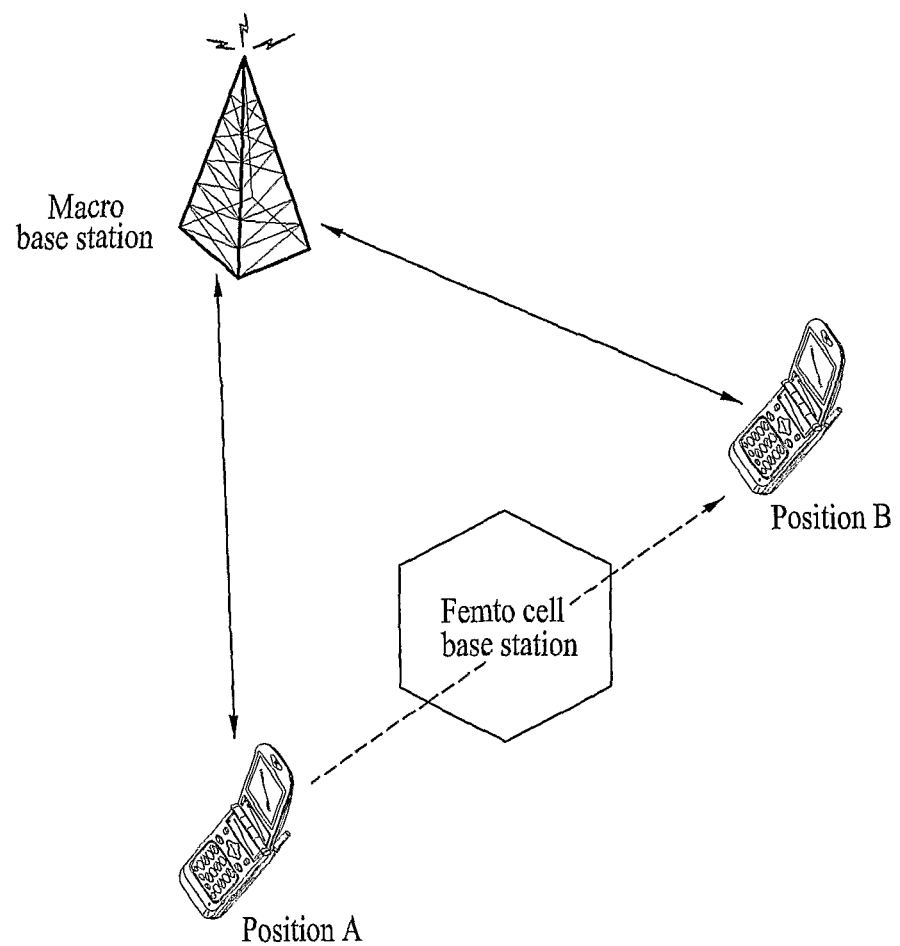
FIG. 2 illustrates a situation that a mobile station served by a macro base station passes area of femto cell.

FIG. 2 illustrates a situation that a mobile station served by a macro base station passes area of femto cell. In FIG. 2, a femto cell base station established as overlay in macro cell area and a femto cell base station and the macro base station use same frequency. Then, a mobile station receives interference form the femto cell base station passing area of femto cell.

Next, a method of resource reservation according to embodiments of the present invention will hereinafter be described with reference to FIGs.

First, a method of resource reservation according to first embodiment of the present invention will be described with reference to FIG. 3.

Figure 3:
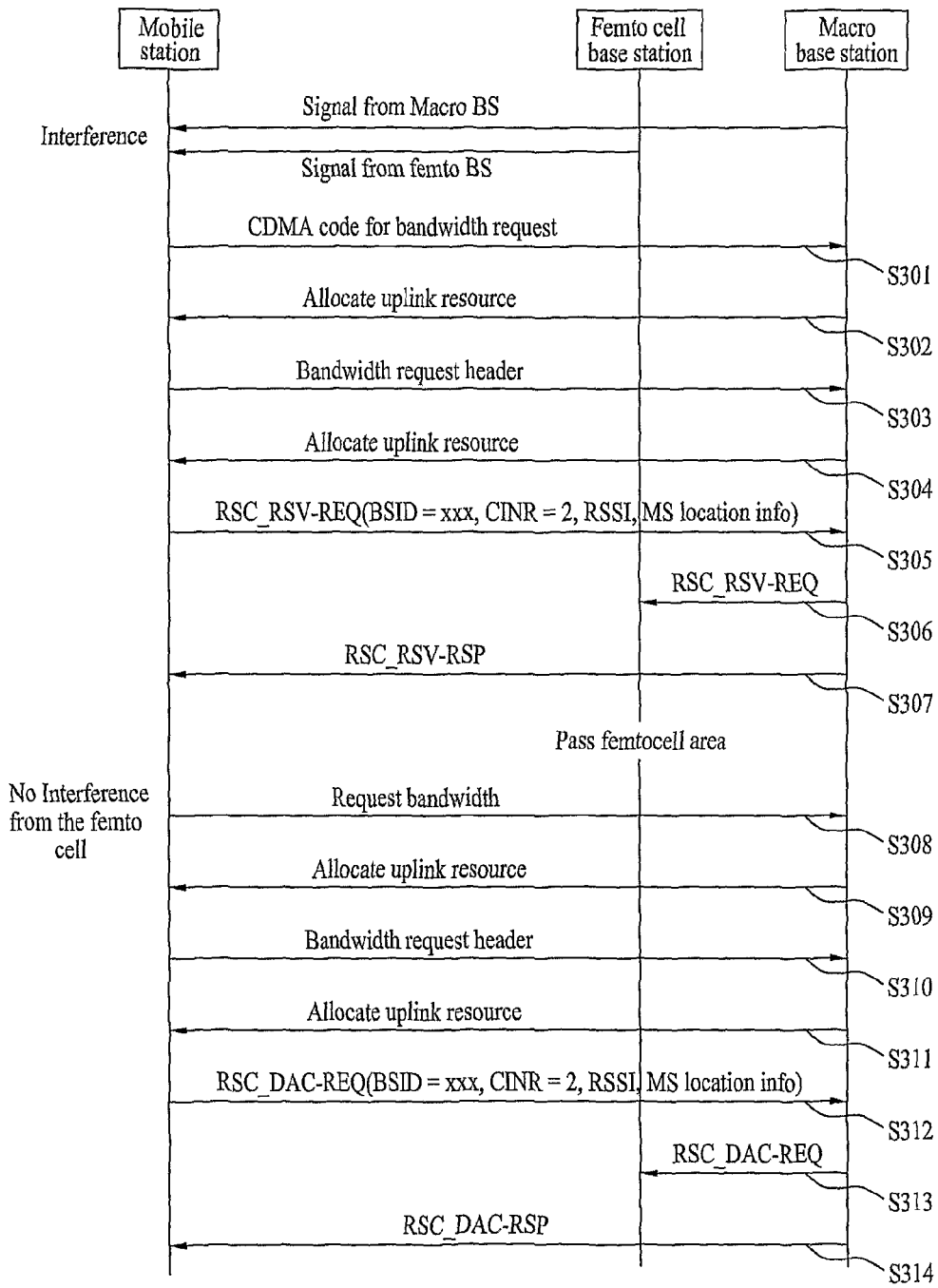
FIG. 3 illustrates a method of resource reservation according to first embodiment of the present invention.

FIG. 3 illustrates a method of resource reservation according to first embodiment of the present invention.

When a mobile station communicating with a macro base station approaches a femto cell base station, it continue connection with the macro base station if condition of handover is not satisfied. If a mobile station has no authority to access to the femto cell base station or speed of the mobile station is high, the mobile station does not perform handover to the femto cell base station.

If a mobile station communicating with a macro base station approaches a femto cell base station which uses same frequency that a macro base station use and does not perform handover to the femto cell base station, it receives interference from the femto cell base station. At this time, the mobile station becomes aware that the interference is from the femto cell base station with base station indicator transmitted through preamble or synch channel of the femto cell base station.

As illustrated in FIG. 3, interference is over a threshold, a mobile station transmits a bandwidth request code to request bandwidth for reporting interference S301. For example, a bandwidth request code can be a CDMA (code division multiple access) code. The threshold is system information and received from a macro base station through a broadcast channel. A method for measuring interference is various. For example, if carrier to noise ratio (CINR) of a macro base station is under a threshold, a mobile station transmits a bandwidth request code. Or, if received signal strength indication (RSSI) of a femto cell base station is over a threshold, a mobile station transmits a bandwidth request code.

Or, if RSSI of a macro base station is over a threshold and CINR a macro base station is under a threshold, a mobile station scans neighbor base stations and detects a femto cell base station interfering. A mobile station measures RSSI of the neighbor base stations and estimates that a femto cell base station whose RSSI is over a threshold is a femto cell base station interfering.

A mobile station is allocated uplink bandwidth S302, and transmits a bandwidth request header to a macro base station S303.

And, a mobile station is allocated uplink bandwidth S304, and transmits first resource reservation request (RSC_RSV-REQ) message to request a femto cell base station not to use resource used by the mobile station S305.

The first RSC_RSV-REQ message can include base station identification (BS ID) of a femto cell base station interfering, RSSI of a macro base station, CINR of a macro base station and location information of a mobile station. and it also can include cell ID of a femto cell base station interfering and RSSI of a femto cell base station interfering. In case that there is one femto cell base station interfering, all of the information is transmitted. A mobile station scans preambles and detects cell ID of a femto cell base station interfering and transmits it to a macro base station. A macro base station provides a mobile station with information of neighbor femto cell base stations based on the received cell ID. Then, a mobile station scans SuperFrame Header (SFH) and detects BS IDs of femto cell base stations interfering and transmits them to a macro base station. The RSC_RSV-REQ message can include BS ID of a macro base station and a femto cell base station, CINR and RSSI of a femto cell base station.

A macro base station transmits a second RSC_RSV-REQ message to request resource reservation to a femto cell base station S306. Resource reservation means that a femto cell base station does not use reserved resource. That is, a femto cell base station does not allocate the reserved resource to mobile stations in femto cell.

A macro base station can transmit a second RSC_RSV-REQ message to a femto cell base station whenever receiving a first RSC_RSV-REQ message. Or, a macro base station can transmit a second RSC_RSV-REQ message to a femto cell base station when receiving first RSC_RSV-REQ messages number of which is a pre-determined number. For example, if the pre-determined number is 5, a macro base station can transmit a second RSC_RSV-REQ message to a femto cell base station when receiving 5 first RSC_RSV-REQ messages.

And, if reservation of resource requested by a mobile station is impossible, a macro base station informs a mobile station of resource which can be reserved. A macro base station includes resource reservation area in a resource reservation-response (RSC_RSV-RSP) message to inform a mobile station of resource which can be reserved and transmits the RSC_RSV-RSP message. If the resource requested by a mobile station is reserved, resource reservation area in a RSC_RSV-RSP message can be set as 0x0000.

If a femto cell base station receives a second RSC_RSV-REQ message, it reserves resource requested. And, a femto cell base station does not allocate the reserved resource to mobile stations in femto cell.

At this time, a femto cell base station reserves resource of a specific amount which is necessary for communication between a mobile station and a macro base station. A macro base station informs a femto cell base station of the specific amount. Or, a femto cell base station estimates the specific amount observing data transmitted from a mobile station to a macro base station.

A femto cell base station does not have to reserve resource requested if enough resource is already reserved.

A femto cell base station does not have to reserve resource requested if data is not transmitted between a mobile station and a macro base station. A femto cell base station can know whether data is transmitted between a mobile station and a macro base station through report of a macro base station or observing data.

In FIG. 3, a macro base station transmits a RSC_RSV-RSP message to report result of resource reservation S307. in case that a macro base station performs resource reservation with a plurality of femto cell base stations, a RSC_RSV-RSP message includes information, cell ID and BS ID of the plurality of femto cell base stations. A mobile station uses the information, cell ID and BS ID when scanning the plurality of femto cell base stations continuously or by period.

As a mobile station escapes from a femto cell base station, interference becomes reduced. A mobile station scans preamble of a femto cell base station continuously and judges that itself escapes from a femto cell base station if RSSI becomes under a threshold. If interference of RSSI becomes under a threshold, a mobile station performs bandwidth request process to transmit first resource deallocation-request (RSC_DAC-REQ) message. That is, a mobile station requests bandwidth S308 and is allocated bandwidth for bandwidth request header transmission S309. And it transmits bandwidth request header S310.

A mobile station is allocated bandwidth S311 and transmits a first RSC_DAC-REQ message S312. The first RSC_DAC-REQ message may include RSSI and CINR of a macro base station, location information of a mobile station and BS ID or cell ID of a femto cell base station. And, the first RSC_DAC-REQ message may include BS ID of a macro base station and RSSI and CINR of a femto cell base station. A macro base station transmits a second RSC_DAC-REQ message to request resource deallocation to a femtocell base station S303 and transmits a resource deallocation-respence (RSC_DAC-RSP) to report result of resource deallocation to a mobile station S314.

Next, a method of resource reservation according to second embodiment of the present invention will be described with reference to FIG. 4.

Figure 4:
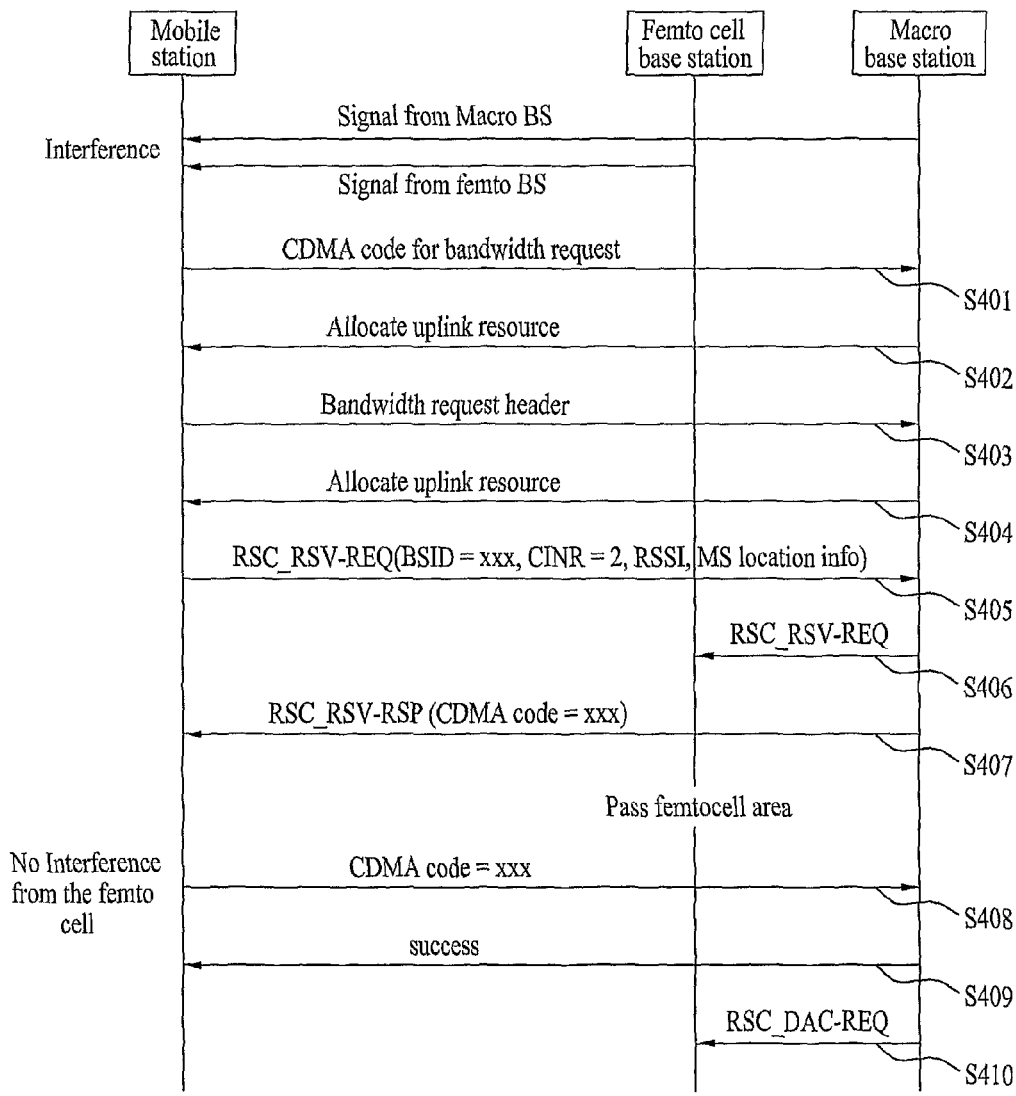
FIG. 4 illustrates a method of resource reservation according to second embodiment of the present invention.

FIG. 4 illustrates a method of resource reservation according to second embodiment of the present invention.

In second embodiment of the present invention, resource deallocation process is simple. As illustrated in FIGS. 4, S401 to S406 is same as S301 to S306 respectively. A macro base station transmits a RSC_RSV-RSP message including a code which a mobile station will use when requesting resource deallocation S407. The code can be an orthogonal code for random access like a CDMA code.

A macro base station can assign each code for resource deallocation to each femto cell base station. Or, code for resource deallocation can be reused according to area of femtocell base stations. In case that a macro base station assigned a reused code to a mobile station, it can know which femto cell base station a mobile station escapes form estimating location of a mobile station with signal strength of the reused code. Or, when receiving a code, a macro base station allocates uplink bandwidth for transmission of cell ID, BS ID RSSI of a femto cell base station to a mobile station. Then, a mobile station transmits information of a femto cell base station to a macro base station through the allocated uplink bandwidth. If there is a plurality of femto cell base stations interfering, a mobile station can transmit information of a femto cell base station when RSSI of a femto cell base station is under a threshold, or a mobile station can transmit information of femto cell base stations when RSSIs of all of the plurality of femto cell base stations are under a threshold.

If interference from a femto cell base station becomes under a threshold, a mobile station transmits the code received through a RSC_RSV-REQ message to a macro base station S408. After receiving the code, a macro base station transmits a success message to a mobile station S409, and releases the reserved resource with a femto cell base station S410. The success message can be transmitted after the reserved resource is released.

Next, a method of resource reservation according to third embodiment of the present invention will be described with reference to FIG. 5. In third embodiment of the present invention, to simplify process of transmitting first RSC_RSV-REQ message, a mobile station transmits a dedicated ranging code if interference is over a threshold and a macro base station allocates uplink bandwidth to a mobile station by period so that a mobile station could report information of measured interference. The information of measured interference can include RSSI or CINR of a femtocell base station interfering. Additionally, the information of measured interference can include signal quality information of a macro base station. RSSI and CINR are examples of the signal quality information.

Figure 5:
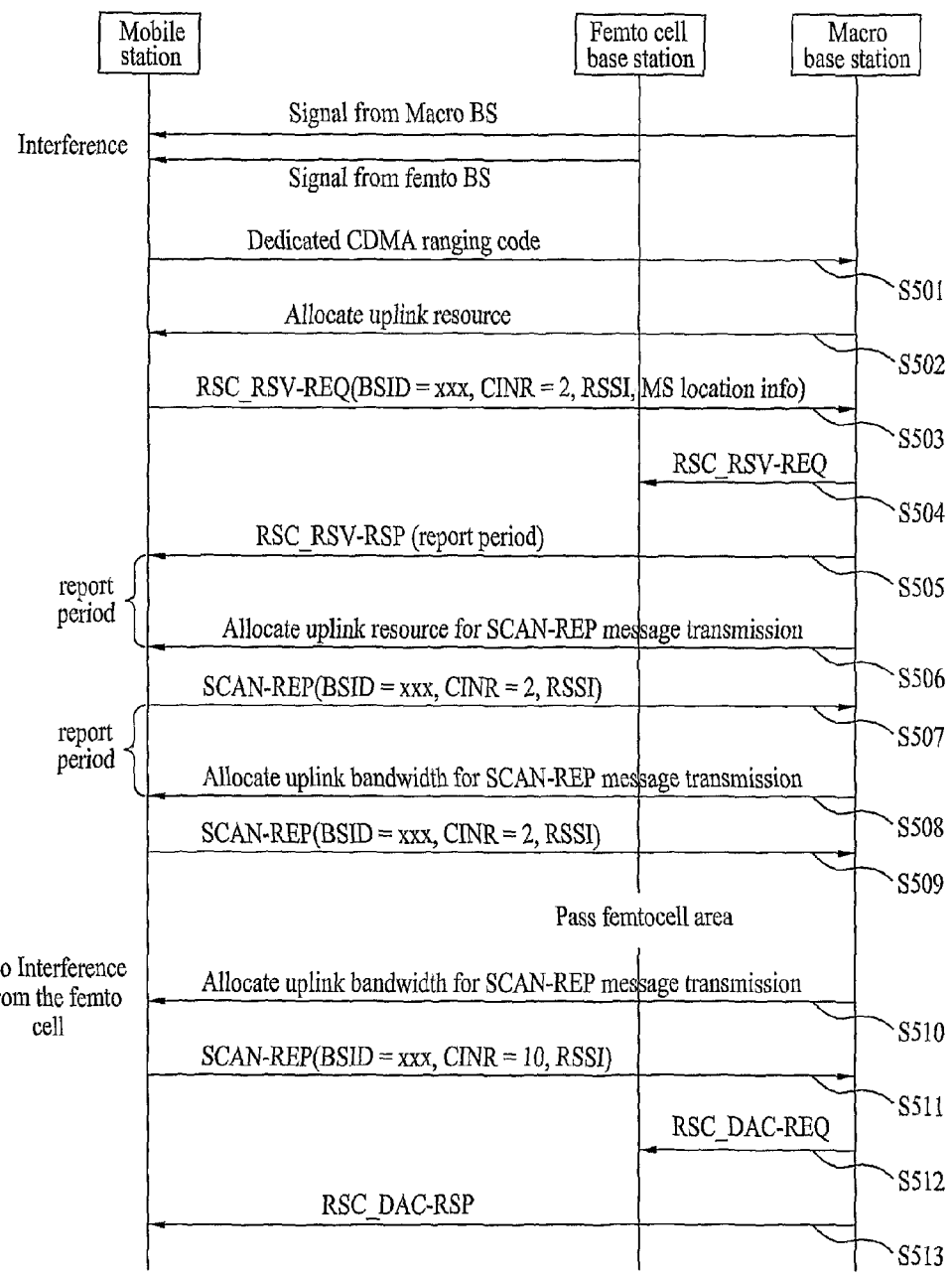
FIG. 5 illustrates a method of resource reservation according to third embodiment of the present invention.

FIG. 5 illustrates a method of resource reservation according to third embodiment of the present invention.

As illustrated in FIG. 5, if a mobile station communicating with a macro base station approaches a femto cell base station using frequency used by the macro base station and does not perform handover to the femto cell base station, it receives interference from the femto cell base station. If the interference becomes over a threshold, the mobile station transmits a dedicated ranging code, which is pre-reserved, to request bandwidth for reporting the interference. For example, the dedicated ranging code is a CDMA code.

Then, the macro base station allocates bandwidth for first RSC_RSV-REQ message transmission to the mobile station S502.

The mobile station transmits first RSC_RSV-REQ message to report the interference and request to a femto cell base station not to use resource used by the mobile station S503.

The macto base station transmits second RSC_RSV-REQ message to request resource reservation to a femto cell base station S504.

The macro base station transmits a RSC_RSV-RSP message including a report period to report information of measured interference to the mobile station S505.

The macro base station allocates uplink bandwidth for interference information transmission at every period S506, S508. The mobile station transmits a scan report (SCAN-REP) message including signal quality information to the macro base station S507, S509. The SCAN-REP message includes BS ID of the femto cell base station interfering, RSSI and CINR of the macro base station. Also, it can includes RSSI and CINR of the femto cell base station interfering.

Escaping the femto cell area, the interference from the femto cell base station becomes reduced. After the interference became under a threshold, the macro base station allocates uplink bandwidth to report the interference at a report period S510. The mobile station transmits SCAN-REP message including signal quality information to the macro base station S511. The signal quality information can be RSSI of the femto cell base station.

After receiving the SCAN-REP message, the macro base station releases the reserved resource with the femto cell base station S512. And, the macro base station transmits a RSC_DAC-RSP message to report result of resource deallocation to the mobile station S513.

Next, a method of resource reservation according to forth embodiment of the present invention will be described with reference to FIG. 6. In forth embodiment of the present invention, a mobile station reports increase and decrease of interference to a macro base station through a channel quality indicator (CQI) report.

Figure 6:
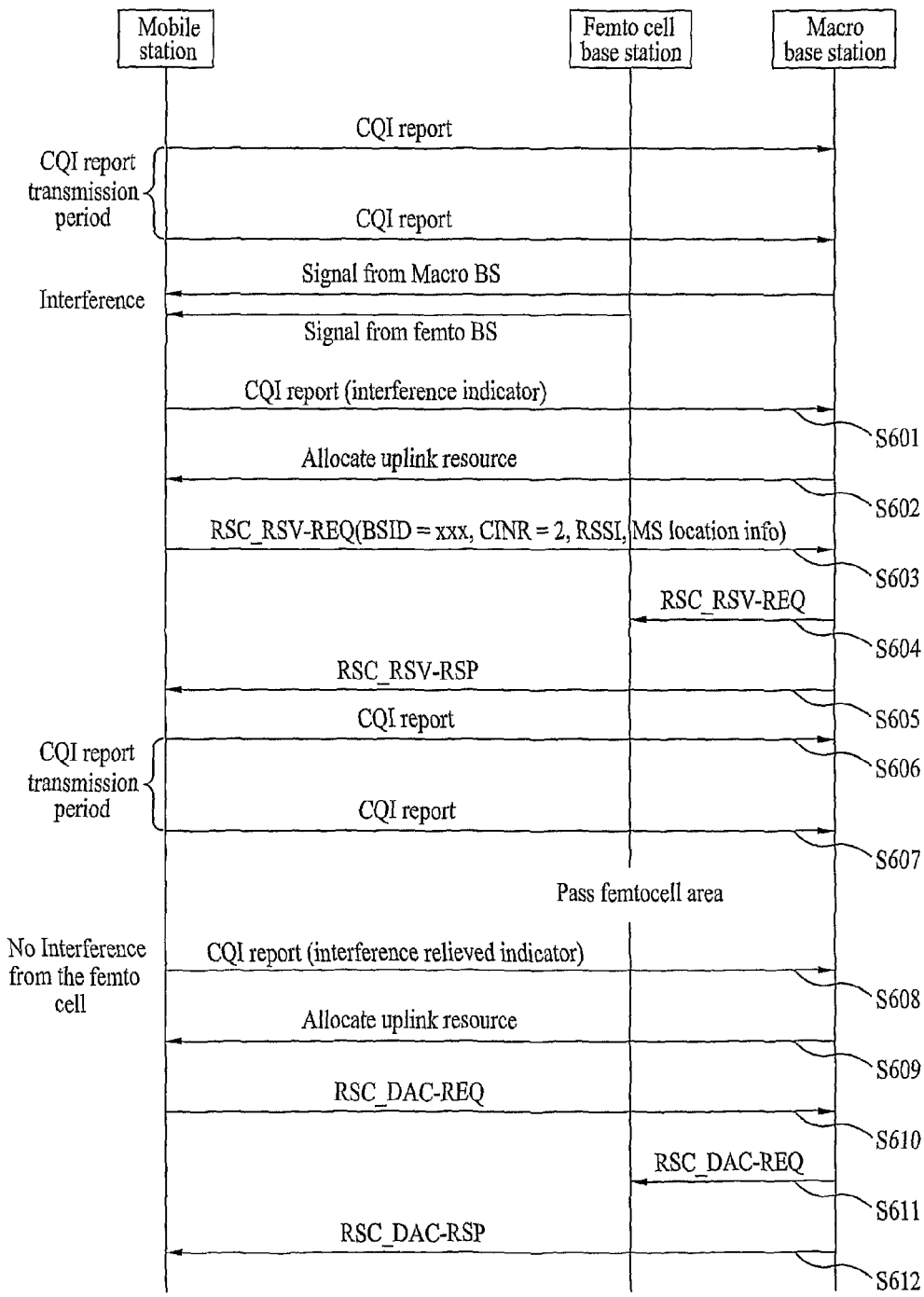
FIG. 6 illustrates a method of resource reservation according to forth embodiment of the present invention.

FIG. 6 illustrates a method of resource reservation according to forth embodiment of the present invention.

As illustration in FIG. 6, communicating with a macro base station, a mobile station transmits a CQI report by period to the macro base station.

If a mobile station communicating with a macro base station approaches a femto cell base station using frequency used by the macro base station and does not perform handover to the femto cell base station, it receives interference from the femto cell base station. After the interference becomes over a threshold, the mobile station transmits a CQI report including an interference indicator to report that interference is over a threshold at CQI report transmission period S601. When transmitting a CQI report, a mobile station transmits one of codewords for CQICH. Some of codewords for CQICH represents signal strength and remains of the codewords for CQICH can be reserved for special purposes. Thus, a mobile station can transmits a CQI report including a codeword reserved for indicating that interference from a femto cell base station is received. That is, the interference indicator is a codeword reserved for indicating that interference from a femto cell base station is received.

The macro base station allocates uplink bandwidth for first RSC_RSV-REQ message to the mobile station S602.

The mobile station transmits first RSC_RSV-REQ message to report the interference and request to a femto cell base station not to use resource used by the mobile station S603. If the mobile station has performed first scanning to detect cell ID, first RSC_RSV-REQ message includes cell ID of a femto cell base station interfering. Then, the macro base station makes a list of femto cell base stations to scan additionally based on the cell ID of a femto cell base station interfering and transmits the list to the mobile station. The mobile station performs second scanning referring to the list, and transmits information of femto cell base stations interfering through the first RSC_RSV-REQ message. The macro base station transmits second RSC_RSV-REQ message to request resource reservation to a femto cell base station S604.

The macro base station transmits a RSC_RSV-RSP message to report result of resource reservation to the mobile station S605. At this time, transmission of the RSC_RSV-RSP can be omitted.

The mobile station transmits a CQI report at every CQI report transmission period S606, S607.

Escaping from the femto cell area, interference from the femto cell base station becomes reduced. After the interference became under a threshold, the mobile station transmits a CQI report including an interference relieved indicator to at CQI report transmission period S608. The interference relieved indicator is a codeword reserved for indicating that interference from a femto cell base station became under a threshold.

The macro base station allocates uplink bandwidth for transmission of a RSC_DAC-REQ message to the mobile station S609.

The mobile station transmits a RSC_DAC-REQ message to the macro base station S610. The RSC_DAC-REQ message can includes BS ID and cell ID of the femto cell base station which interfered. If there is a plurality of femto cell base stations which interfered, the mobile station can report which femto cell base station it escapes from. Or, the mobile station can transmit the interference relieved indicator when it escapes from all of the plurality of femto cell base stations which interfered.

After receiving the RSC_DAC-REQ message, the macro base station releases the reserved resource with the femto cell base station S611. And, the macro base station transmits a RSC_DAC-RSP message to report result of resource deallocation to the mobile station S612.

Next, a method of resource reservation according to fifth embodiment of the present invention will be described with reference to FIG. 7.

Figure 7:
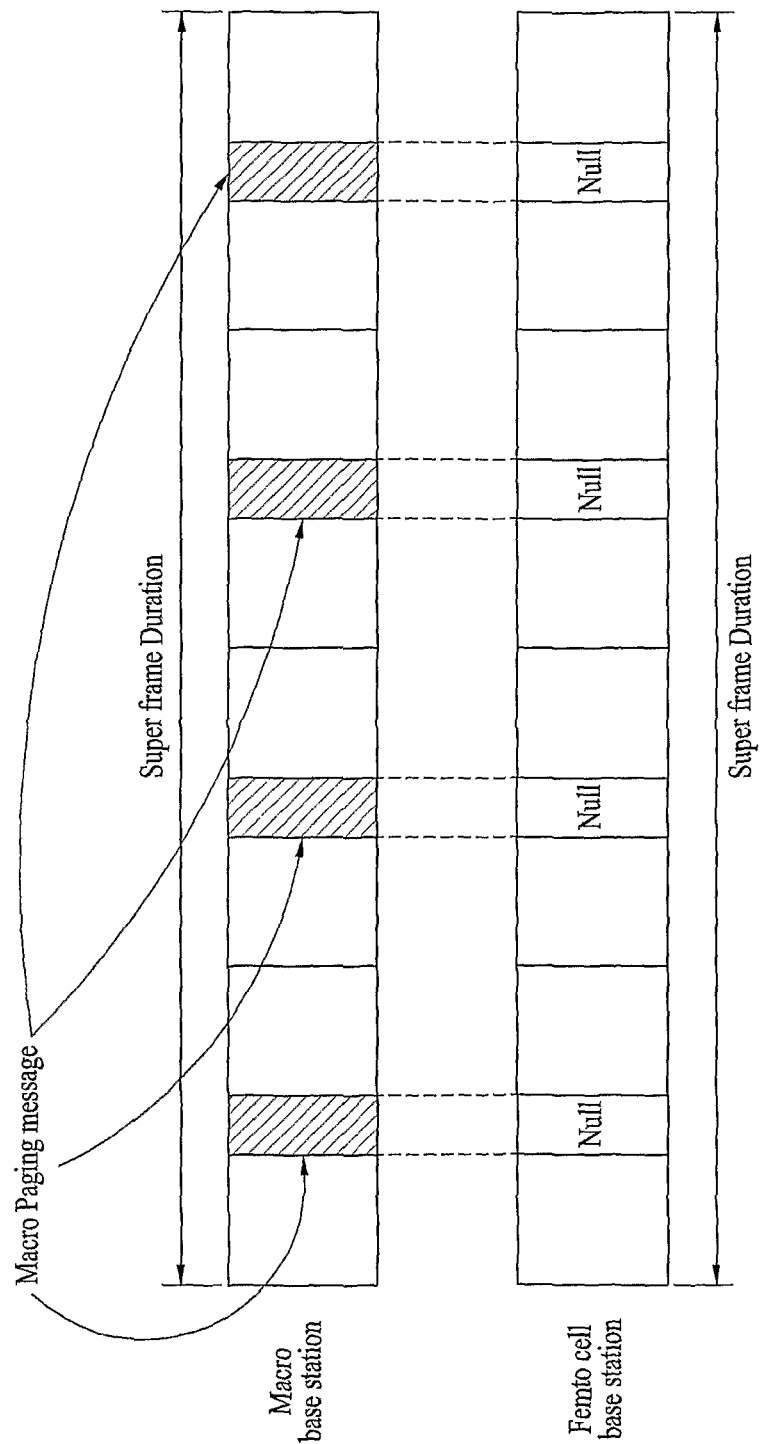
FIG. 7 illustrates a method of resource reservation according to fifth embodiment of the present invention.

FIG. 7 illustrates a method of resource reservation according to fifth embodiment of the present invention.

A mobile station communication with a macro base station checks paging messages for paging listening interval and decodes a full paging message at Pre-defined location. Interference must be small for a mobile station to receive paging message from a macro base station.

Therefore, as illustrated in FIG. 7, in fifth embodiment of the present invention, a femto cell base station using frequency used by a macro base station reserves resource of interval at which a macro base station broadcasts paging messages. Then, a mobile station can receive paging messages without interference. A femto cell base station can reserve resource of only interval at which paging messages is broadcasted or entire subframe or frame at which paging messages is broadcasted.

There are pre-resource-reservation and on demand resource-reservation in resource reservation methods.

In pre-resource-reservation, a femto cell base station reserves all resource which mobile stations connecting to a macro base station use constantly and release the reserved resource when a mobile station escapes from macro cell area. A femto cell base station reserves resource of pre-defined position at which a macro base station transmits paging messages.

In on demand resource-reservation, if a mobile station receives interference from a femto cell base station, it requests resource reservation the femto cell base station to a macro base station. The macro base station transmits resource reservation order to the femto cell base station through backhaul. The reserved resource is released when a mobile station escapes from femto cell area.

Next, a method of resource reservation according to on demand resource-reservation will be described.

If a mobile station detects signal of a femto cell base station as scanning for paging listening interval, it can know that it approaches femto cell area. If a mobile station approaches femto cell area, it performs location update and requests resource reservation of a femto cell base station to a macro base station. Then, the macro base station requests the femto cell base station resource reservation.

After then, if a mobile station does not detect signal of a femto cell base station as scanning for paging listening interval, it can know that it has escaped from femto cell area. If a mobile station has escaped from femto cell area, it performs location update and requests release reserved resource to a macro base station.

Therefore, on demand resource-reservation is used if a mobile station performs location update and pre-resource-reservation is used if a mobile station does not perform location update.

Next, it will be described that a mobile station request resource reservation through an advanced air interface scan report (AAI_SCN-REP).

First, trigger for scanning through which a mobile station makes an AAI_SCN-REP will be described.

The trigger for scanning can be same or different from trigger for handover. Table 1 and 2 represents triggers for scanning when the trigger for scanning is different from trigger for handover.

Table 1 and 2 represents triggers for initial scanning and scanning for reporting result to a macro base station.

TABLE 1

| Name | Type | Length (Bytes) | Value |
| --- | --- | --- | --- |
| Type/Function/Action | yy.1 | 1 | |
| Trigger Value | yy.2 | 1 | Trigger value is the value used in comparing measured metric for determining a trigger condition |

TABLE 2

| Name | Length (Bits) | Value |
| --- | --- | --- |
| Type | 1 | Trigger metric type: 0x0: CINR metric 0x1; RSSI |
| Function | | Computation defining trigger condition: 0x0: Reserved 0x1: Metric of neighbor BS is greater than absolute value 0x2: Metric of neighbor BS is greater than serving BS metric by relative value 0x3: Metric of serving BS is greater than absolute value 0x4: Metric of serving BS is less than absolute value 0x5-0x8: Reserved |
| Action | | 0x0: Reserved 0x1: Respond on trigger with AAI_SCN_REQ 0x2: Respond on trigger with AAI_SCN-REP |

In table 1 and 2, a type field represents a criterion with which a mobile station decides to perform scanning or not. The criterion can be RSSI or CINR. A function field represents when a mobile station performs scanning or reports result of scanning.

In case that the type field is 0x0, a mobile station performs operation of an action field if the function field is 0x1 and CINR of neighbor base station is greater than absolute value, and a mobile station performs operation of an action field if the function field is 0x2 and CINR of neighbor base station is greater than CINR of serving BS, and a mobile station performs operation of an action field if the function field is 0x3 and CINR of a serving base station is greater than absolute value, and a mobile station performs operation of an action field if the function field is 0x4 and CINR of neighbor base station is less than absolute value. The absolute value is a trigger value.

An action field represents operation a mobile station will perform. A mobile station performs scanning if the action field is 0x1, and transmits an AAI_SCN-REP message if the action field is 0x2.

Next, a method of resource reservation according to sixth embodiment of the present invention will be described with reference to FIG. 8.

Figure 8:
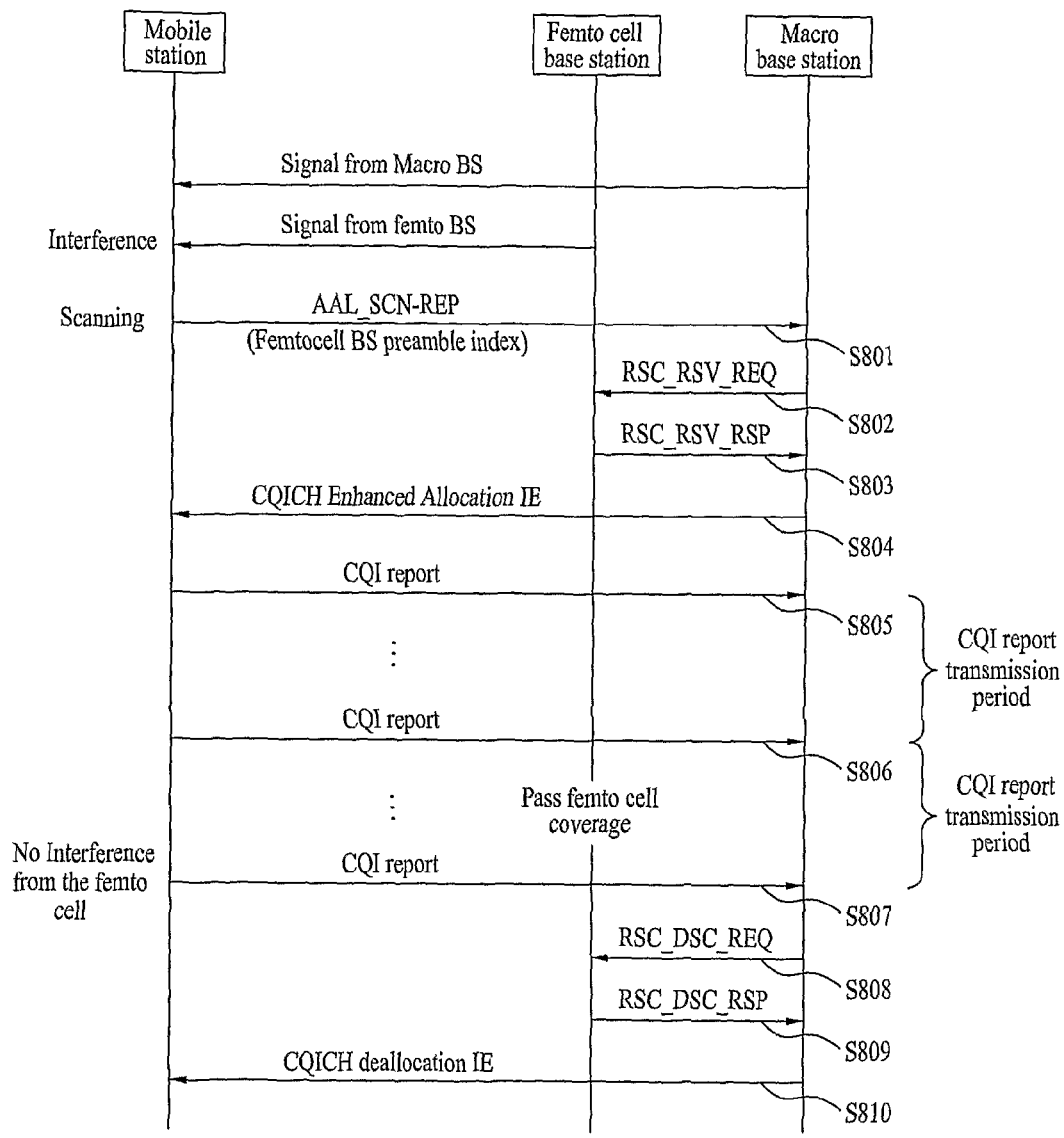
FIG. 8 illustrates a method of resource reservation according to sixth embodiment of the present invention.

FIG. 8 illustrates a method of resource reservation according to sixth embodiment of the present invention.

In sixth embodiment of the present invention, a macro base station reserves and releases resource without request of a mobile station.

As illustrated in FIG. 8, if a mobile station communicating with a macro base station approaches a femto cell base station using frequency used by the macro base station and does not perform handover to the femto cell base station, it receives interference from the femto cell base station.

After the interference becomes over a threshold, the mobile station performs scanning and transmits an AAI_SCN-REP message including result of the scanning to a macro base station S801. The AAI_SCN-REP message includes BS ID of preamble index of a femto cell base station interfering.

The macro base station transmits a RSC_RSV-REQ message to the femto cell base station S802 and receives a RSC_RSV-RSP message S803.

The macro base station allocates uplink bandwidth for a CQI report to the mobile station by period S804, the mobile station transmits a CQI report by period S805, S806.

If the mobile station escapes from femto cell area, it transmits a CQI report including an interference relieved indicator to the macro base station S807.

The macro base station transmits a RSC_DSC-REQ message to the femto cell base station S808 and receives a RSC_DSC-RSP message S809.

Since a mobile station need not transmits a CQI report by period if interference is under a threshold, the macro base station releases the allocated CQI channel S810.

Figure 9:
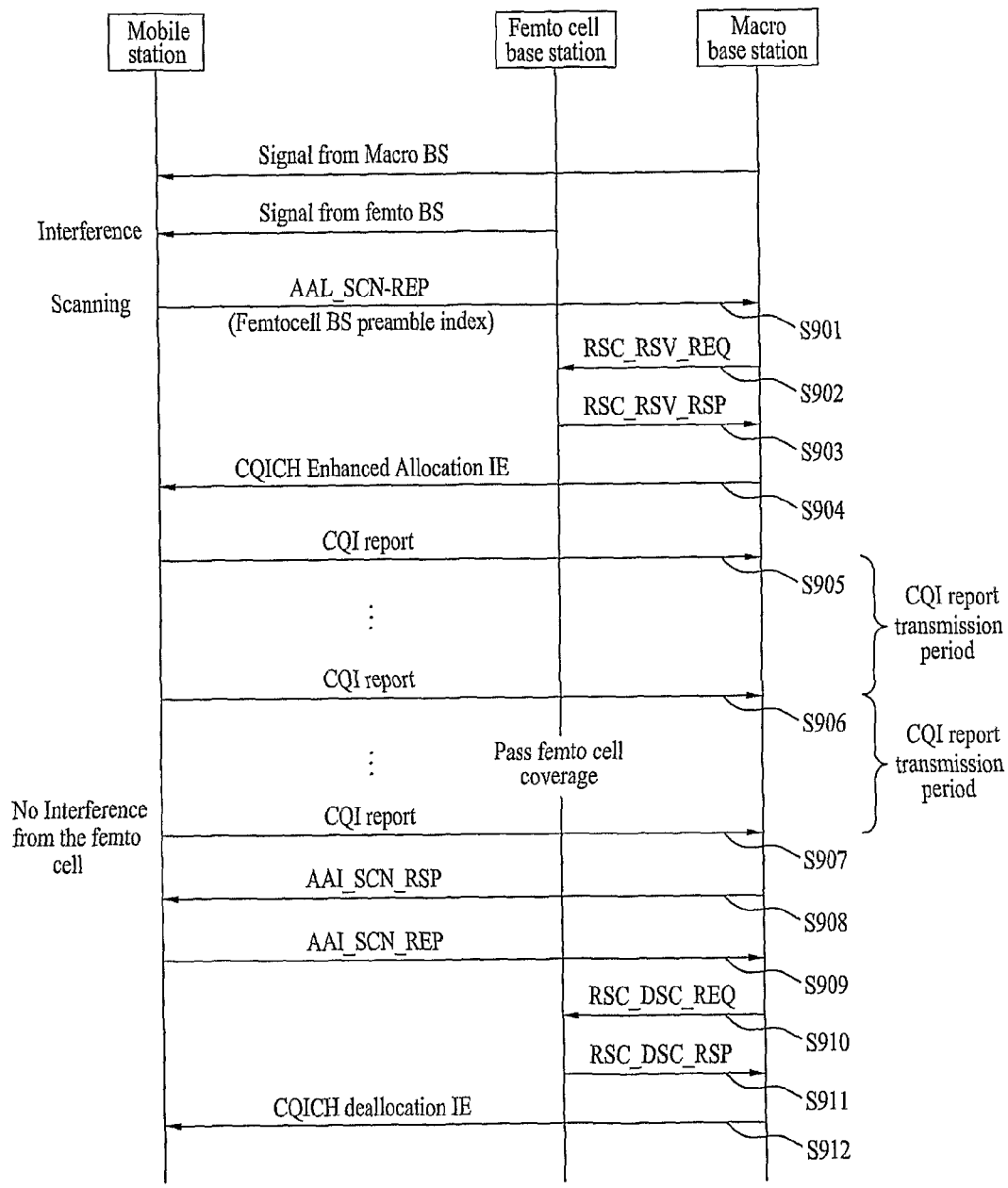
FIG. 9 illustrates a method of resource reservation according to seventh embodiment of the present invention.

Next, a method of resource reservation according to seventh embodiment of the present invention will be described with reference to FIG. 9. FIG. 9 illustrates a method of resource reservation according to seventh embodiment of the present invention.

In seventh embodiment of the present invention, a macro base station reserves resource when a mobile station receives interference from a femto cell base station, and releases resource when receiving an AAI_SCN-REP message from a mobile station.

As illustrated in FIG. 9, if a mobile station communicating with a macro base station approaches a femto cell base station using frequency used by the macro base station and does not perform handover to the femto cell base station, it receives interference from the femto cell base station.

If the interference becomes over a threshold, the mobile station performs scanning and transmits an AAI_SCN-REP message including result of the scanning to a macro base station S901. The AAI_SCN-REP message includes BS ID of preamble index of a femto cell base station interfering.

The macro base station transmits a RSC_RSV-REQ message to the femto cell base station S902 and receives a RSC_RSV-RSP message S903.

The macro base station allocates uplink bandwidth for a CQI report to the mobile station by period S904, the mobile station transmits a CQI report by period S905, S906.

If the mobile station escapes from femto cell area, it transmits a CQI report including an interference relieved indicator to the macro base station S907.

The macro base station transmits an unsolicited advanced air interface scan response (unsolicited AAI_SCN-RSP) message to order the mobile station to scan neighbor femto cell base station S908.

The mobile station transmits an AAI_SCN-REP message to report result of scanning S909. If the macro base station confirms that there are no femto cell base station interfering through the AAI_SCN-REP message, it transmits a RSC_DSC-REQ message to the femto cell base station S910 and receives a RSC_DSC-RSP message S911. The macro base station releases the allocated CQI channel S912.

Figure 10:
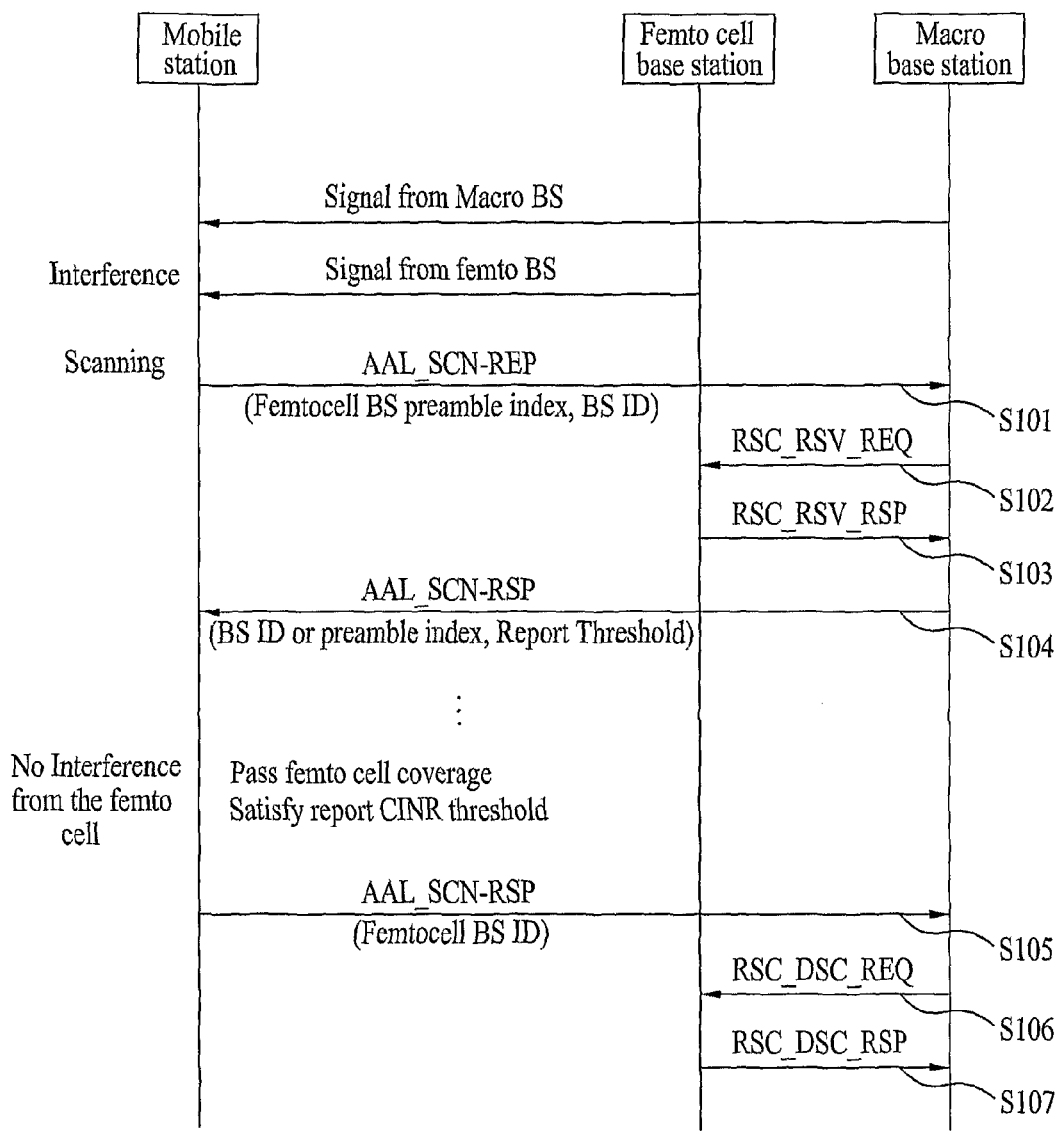
FIG. 10 illustrates a method of resource reservation according to eighth embodiment of the present invention.

Next, a method of resource reservation according to eighth embodiment of the present invention will be described with reference to FIG. 10. FIG. 10 illustrates a method of resource reservation according to eighth embodiment of the present invention.

In eighth embodiment of the present invention, a macro base station reserves resource when a mobile station receives interference from a femto cell base station, and the mobile station does not transmit a CQI report by period.

As illustrated in FIG. 10, if a mobile station communicating with a macro base station approaches a femto cell base station using frequency used by the macro base station and does not perform handover to the femto cell base station, it receives interference from the femto cell base station.

If the interference becomes over a threshold, the mobile station performs scanning and transmits an AAI_SCN-REP message including result of the scanning to a macro base station S101. The AAI_SCN-REP message includes BS ID or preamble index of a femto cell base station interfering.

The macro base station transmits a RSC_RSV-REQ message to the femto cell base station S102 and receives a RSC_RSV-RSP message S103.

The macro base station transmits an AAI_SCN-RSP message to the mobile station S104. The AAI_SCN-RSP message includes BS ID or preamble index of the femto cell base station and CINR threshold for transmission of an AAI_SCN-REP message.

If CINR of the macro base station becomes over the CINR threshold after escaping from femto cell area, a mobile station scans neighbor base stations and transmits an AAI_SCN-REP message including result of scanning to the macro base station S105.

The macro base station transmits a RSC_DSC-REQ message to the femto cell base station S106 and receives a RSC_DSC-RSP message S107.

Figure 11:
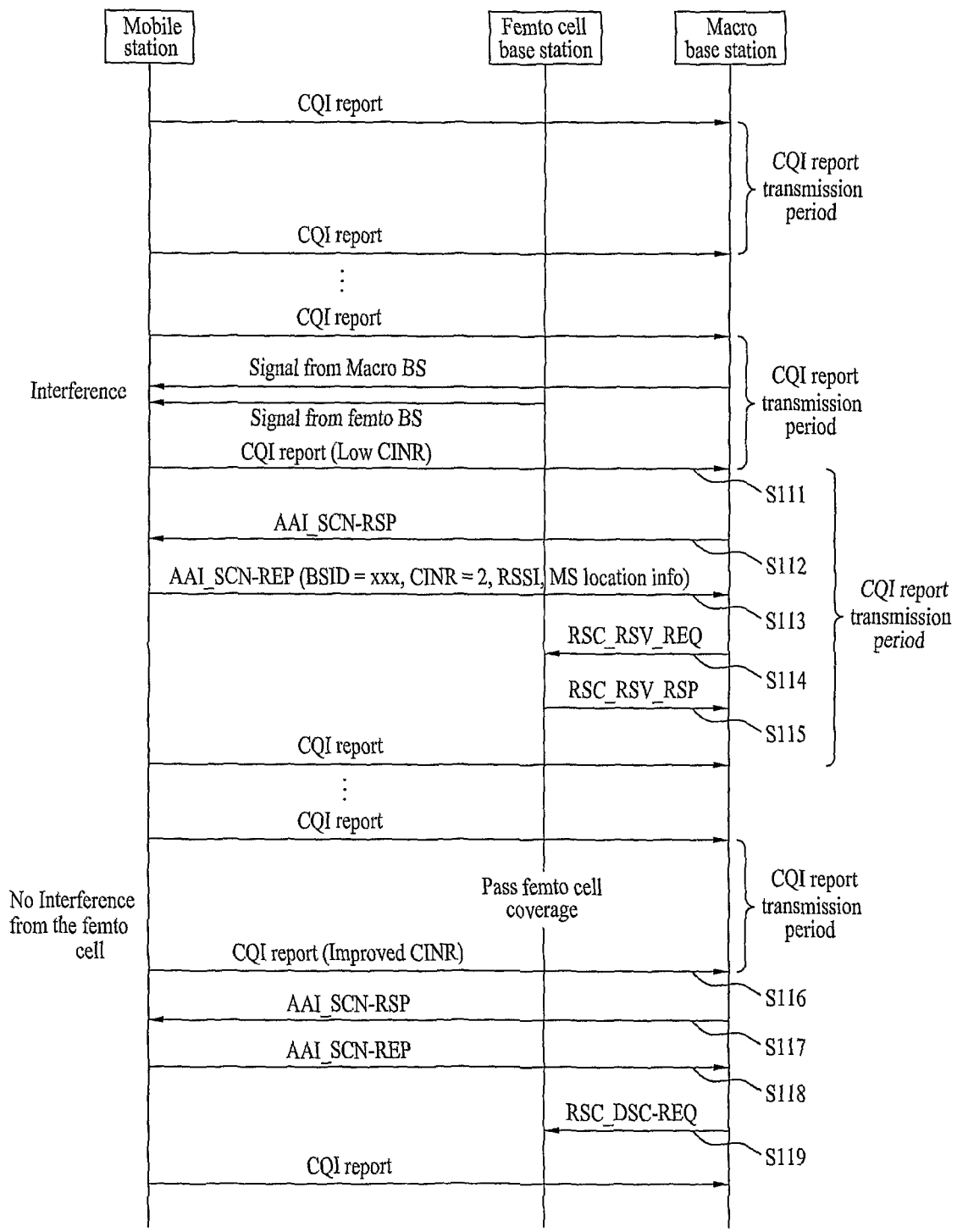
FIG. 11 illustrates a method of resource reservation according to ninth embodiment of the present invention.

Next, a method of resource reservation according to ninth embodiment of the present invention will be described with reference to FIG. 11. FIG. 11 illustrates a method of resource reservation according to ninth embodiment of the present invention.

As illustrated in FIG. 11, a mobile station communicating with a macro base station transmits a CQI report to the macro base station by period.

If a mobile station communicating with a macro base station approaches a femto cell base station using frequency used by the macro base station and does not perform handover to the femto cell base station, it receives interference from the femto cell base station. If a mobile station transmits a CQI report when receiving interference S111, a macro base station transmits an unsolicited AAI_SCN-RSP to the mobile station S112. The unsolicited AAI_SCN-RSP may include BS ID of femto cell base stations which the mobile station will scan.

The mobile station performs scanning and transmits an AAI_SCN-REP message to the macro base station S113. The AAI_SCN-REP message includes BS ID of a femto cell base station interfering and CINR and RSSI of the macro base station. And, the AAI_SCN-REP message may also include location information of the mobile station.

The macro base station transmits a RSC_RSV-REQ message to the femto cell base station S114 and receives a RSC_RSV-RSP message S115.

The mobile station transmits a CQI report to the macro base station by period. After escaping from femto cell area, the mobile station transmits a CQI report including a pre-defined value that informs that interference is reduced to the macro base station S116.

The macro base station transmits an unsolicited AAI_SCN-RSP to the mobile station S117. The mobile station transmits an AAI_SCN-REP message to the macro base station S118. The AAI_SCN-REP message includes BS ID of a femto cell base station which has interfered.

The macro base station releases the reserved resource with the femto cell base station S119. After resource deallocation, the mobile station transmits a CQI report to the macro base station by period.

Figure 12:
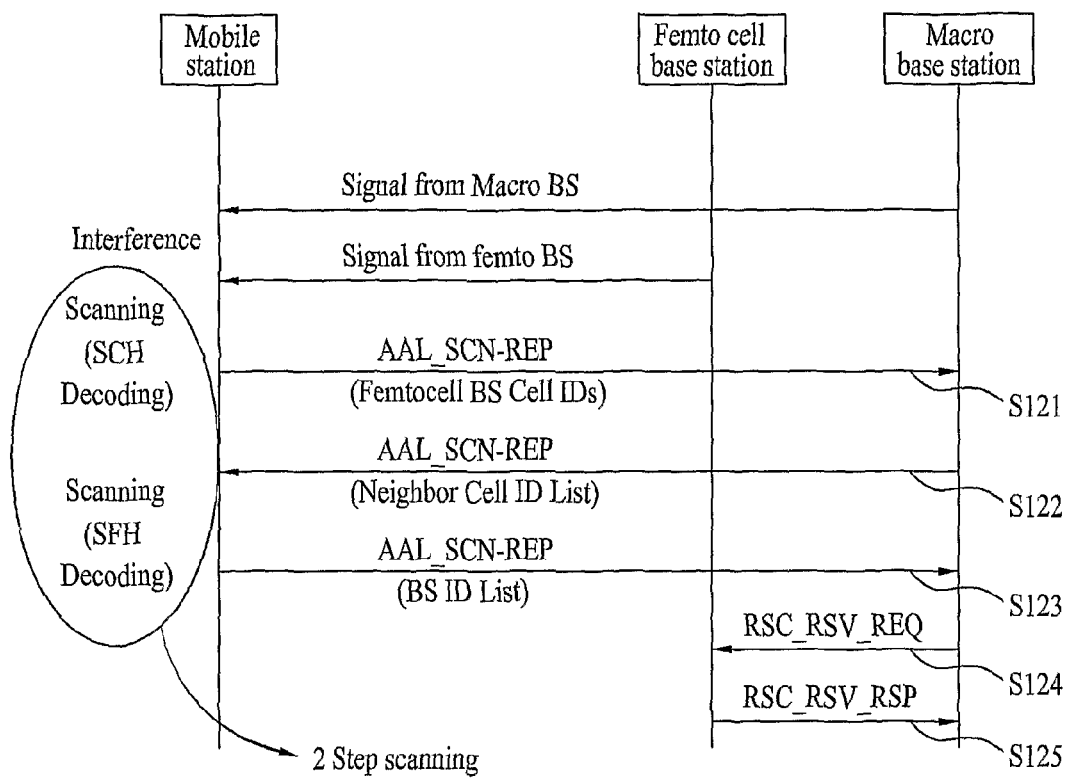
FIG. 12 illustrates two steps scanning.

In sixth to ninth embodiments of the present invention, a mobile station can performs two steps scanning. Two steps scanning will be described referring to FIG. 12. FIG. 12 illustrates two steps scanning.

If a mobile station communicating with a macro base station approaches a femto cell base station using frequency used by the macro base station and does not perform handover to the femto cell base station, it receives interference from the femto cell base station.

If trigger for scanning is satisfied, a mobile station performs scanning and transmits an AAI_SCN-REP message including result of scanning to a macro base station S121. The AAI_SCN-REP message includes cell ID of a detected femto cell base station.

The macro base station makes a list of neighbor femto cell base stations based on the cell ID of a detected femto cell base station, and transmits an AAI_SCN-RSP including the list to the mobile station S122.

The mobile station decodes superframe header (SFH) of the neighbor femto cell base stations and transmits BS IDs of the neighbor femto cell base stations to the macro base stations S123. The macro base station detects a femto cell base station which interferes most, and request resource reservation to the detected femto cell base station and receives a response S125.

Figure 13:
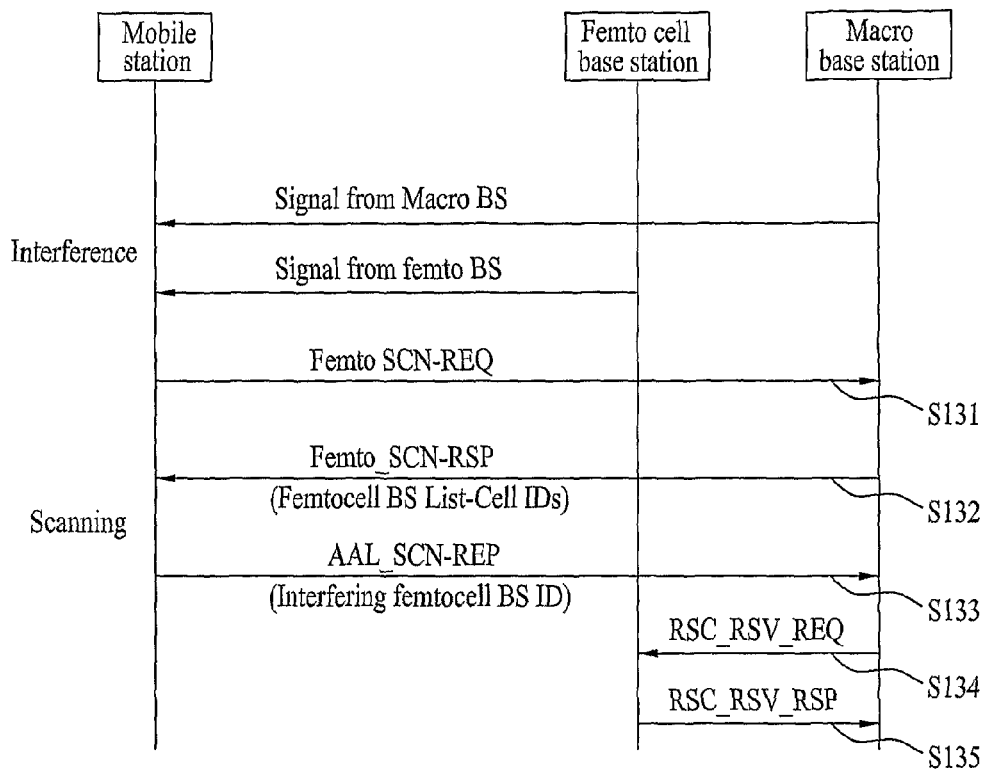
FIG. 13 illustrates a case that a mobile station performs scanning using a received list of femtocell base stations.

Next, it will be described that a mobile station performs scanning using a received list of femtocell base stations referring to FIG. 13. FIG. 13 illustrates a case that a mobile station performs scanning using a received list of femtocell base stations.

If a mobile station communicating with a macro base station approaches a femto cell base station using frequency used by the macro base station and does not perform handover to the femto cell base station, it receives interference from the femto cell base station.

If trigger for scanning is satisfied, a mobile station transmits a Femto_SCN-REQ message to a macro base station S131. The Femto_SCN-REQ message can be a triggering message for receiving BS IDs of neighbor femto cell base stations.

The macro base station transmits a Femto_SCN-RSP message including a list of BS IDs of femto cell base stations in macro cell area to the mobile station S132. The mobile station performs scanning based on the list, and transmits BS ID of a femto cell base station interfering to the macro base station S133. the macro base station requests the femto cell base station interfering to reserve resource S134.

Figure 14:
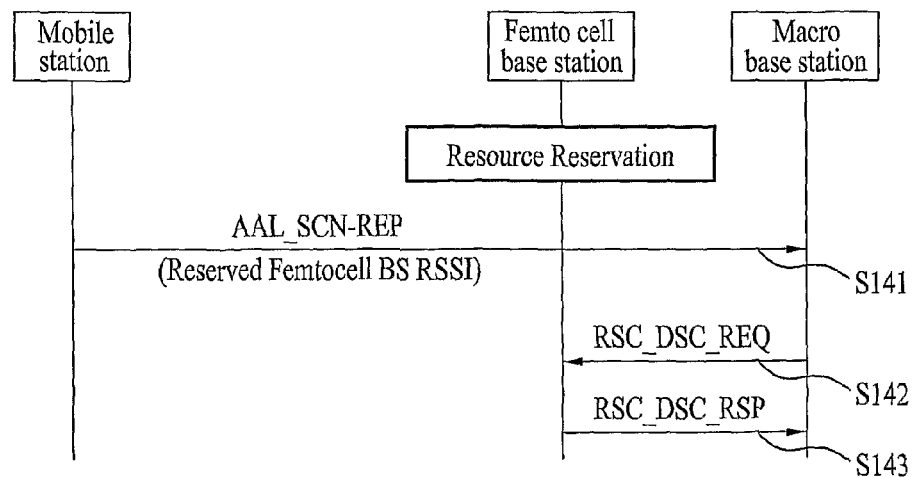
FIG. 14 illustrates that a mobile station transmits RSSI of a femto cell base station to request resource deallocation to a macro base station.

FIG. 14 illustrates that a mobile station transmits RSSI of a femto cell base station to request resource deallocation to a macro base station.

As illustrated in FIG. 14, when the resource has been reserved, if a mobile station measures RSSI of a femto cell base station and trigger for transmission of an AAI_SCN-REP message is satisfied (RSSI of the femto cell base station is under a threshold), the mobile station transmits an AAI_SCN-REP message including RSSI of the femto cell base station to the macro base station S141. the macro base station request resource deallocation to the femto cell base station S142.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

The invention claimed is:

1. A method of resource reservation request of a mobile station in a wireless communication system with femto cells, the method comprising:
   transmitting a resource reservation request message to a macro base station to request a femto cell base station not to use resource used by the mobile station if interference from the femto cell base station is over a threshold; and
   receiving a resource reservation response message from a macro base station.

2. The method according to claim 1, further comprising:
   transmitting a resource release request message to a macro base station if the interference from the femto cell base station is under the threshold.

3. The method according to claim 1, wherein the resource reservation response message includes a code, and
   further comprising:
   transmitting the code to a macro base station if the interference from the femto cell base station is under the threshold.

4. The method according to claim 1, further comprising:
transmitting a pre-determined code to the macro base station to request bandwidth for transmitting the resource reservation request message.

5. The method according to claim 1, wherein the resource reservation response message includes a report period at which the mobile station reports signal quality information to the macro base station, and further comprising:
transmitting the signal quality information to the macro base station every the report period.

6. The method according to claim 1, wherein the resource reservation request message includes at least base station identification (ID) of the femto cell base station, received signal strength indication (RSSI) of the macro base station, carrier to noise ratio (CINR) of the macro base station or location information of the mobile station.

7. A method of resource reservation of a base station in a wireless communication system with femto cells, the method comprising:
receiving a resource reservation request message from a mobile station to request a femto cell base station not to use resource used by the mobile station; and
requesting the femto cell base station to reserve the resource used by the mobile station.

8. The method according to claim 7, further comprising:
receiving a resource release request message from the mobile station; and
requesting the femto cell base station release the reserved resource.

9. The method according to claim 7, further comprising:
receiving a CQI (channel quality indication) report to inform that interference of the femto cell base station is over a threshold from the mobile station; and
allocating the mobile station uplink bandwidth for transmitting the resource reservation request message.

10. A method of resource reservation request of a mobile station in a wireless communication system with femto cells, the method comprising:
transmitting first advanced air interface scan report (AAI_SCN-REP) message to a macro base station to request a femto cell base station not to use resource used by the mobile station if interference from the femto cell base station is over a threshold;
being allocated bandwidth for channel quality indication (CQI) report transmission by period from the macro base station; and
transmitting CQI report by period to the macro base station.

11. The method according to claim 10, further comprising:
transmitting CQI report including an interference indicator indicating that interference from the femto cell base station is reduced to the macro base station.

12. The method according to claim 11, further comprising:
receiving an unsolicited advanced air interface scan response (unsolicited AAI_SCN-RSP) message to order to scan neighbor base stations from the macro base station; and
scanning the neighbor base stations and transmitting second AAI_SCN-REP message including result of the scanning to the macro base station.

13. A method of resource reservation of a macro base station in a wireless communication system with femto cells, the method comprising:
receiving first advanced air interface scan report (AAI_SCN-REP) message to request a femto cell base station not to use resource used by the mobile station from a mobile station;
allocating bandwidth for channel quality indication (CQI) report transmission by period to the mobile station; and
receiving CQI report by period from the mobile station.

14. The method according to claim 13, further comprising:
receiving CQI report including an interference indicator indicating that interference from the femto cell base station is reduced from the mobile station.

15. The method according to claim 14, further comprising:
transmitting an unsolicited advanced air interface scan response (unsolicited AAI_SCN-RSP) message to order to scan neighbor base stations to the mobile station; and
receiving second AAI_SCN-REP message including result of the scanning the neighbor base stations from the mobile station.

16. A method of resource reservation request of a mobile station in a wireless communication system with femtocells, the method comprising:
transmitting first advanced air interface scan report (AAI_SCN-REP) message to a macro base station to request a femto cell base station not to use resource used by the mobile station if interference from the femto cell base station is over a threshold;
receiving an advanced air interface scan response (AAI_SCN-RSP) message including a carrier to noise ratio (CINR) threshold for second AAI_SCN-REP message transmission from the macro base station;
scanning neighbor base stations if CINR is over the CINR threshold; and
transmitting second AAI_SCN-REP message including result of the scanning the neighbor base stations to the macro base station.

17. A method of resource reservation of a macro base station in a wireless communication system with femto cells, the method comprising:
receiving first advanced air interface scan report (AAI_SCN-REP) message to request a femto cell base station not to use resource used by a mobile station from the mobile station;
transmitting an advanced air interface scan response (AAI_SCN-RSP) message including a carrier to noise ratio (CINR) threshold for second AAI_SCN-REP message transmission to the mobile station; and
receiving second AAI_SCN-REP message including result of scanning neighbor base stations from the mobile station.

18. A method of resource reservation request of a mobile station in a wireless communication system with femto cells, the method comprising:
transmitting a channel quality indicator (CQI) report to a macro base station when interference of femto cell base station is over a threshold;
receiving an unsolicited advanced air interface scan response (AAI_SCN-RSP) message from the macro base station; and
scanning neighbor base stations and transmitting advanced air interface scan report (AAI _SCN-REP) message including result of the scanning to the macro base station.

19. A method of operating a resource reservation by a base station in a wireless communication system with femto cells, the method comprising:
receiving a first message including a result of a scanning from a mobile station, wherein the scanning is performed by the mobile station if an interference from a femto cell base station is over a threshold, wherein the first message further includes an identifier (ID) of the femto cell base station; and transmitting a second message to the femto cell base station based on the result of the scanning, wherein the second message indicates a request of resource reservation for a resource used by the mobile station.

20. The method of claim 19, wherein the first message further includes a preamble index of the femto cell base station.

21. The method of claim 19, wherein the first message further includes a value of a carrier to noise ratio, a carrier to interference plus noise ratio or a received signal strength indication (RSSI) of the femto cell base station.

22. The method of claim 19, further comprising:

transmitting a third message to the femto cell base station if the interference from the femto cell base station is less than the threshold, wherein the third message indicates a release of the resource reservation.

23. The method of claim 19, wherein the request of the resource reservation is that the femto cell base station does not use the resource used by the mobile station.

24. The method of claim 19, wherein the first message is an advanced air interface scan report (AAI-SCN-REP) message.

25. A base station for operating a resource reservation in a wireless communication system with femto cells, the base station comprising:

means for receiving a first message including a result of a scanning from a mobile station, wherein the scanning is performed by the mobile station if an interference from a femto cell base station is over a threshold, wherein the first message further includes an identifier (ID) of the femto cell base station; and means for transmitting a second message to the femto cell base station based on the result of the scanning, wherein the second message requests that the femto cell base station does not use a resource used by the mobile station.

* * * * *